United States Patent [19]

Stanisci

[11] Patent Number: 5,331,443
[45] Date of Patent: Jul. 19, 1994

[54] LASER ENGRAVED VERIFICATION HOLOGRAM AND ASSOCIATED METHODS

[75] Inventor: Joseph J. Stanisci, Locust Valley, N.Y.

[73] Assignee: Crown Roll Leaf, Inc., Paterson, N.J.

[21] Appl. No.: 923,834

[22] Filed: Jul. 31, 1992

[51] Int. Cl.$^5$ ............................................. G02B 5/18
[52] U.S. Cl. ........................................ 359/2; 359/8; 283/86; 356/71
[58] Field of Search .......................... 359/2, 3, 8, 35; 283/86, 904; 356/71

[56] References Cited

U.S. PATENT DOCUMENTS

| | | |
|---|---|---|
| 3,643,216 | 2/1972 | Greenaway et al. . |
| 3,647,275 | 3/1972 | Ward . |
| 3,735,374 | 5/1973 | Rembault . |
| 4,014,602 | 3/1977 | Ruell . |
| 4,120,559 | 10/1978 | Abramson et al. . |
| 4,126,373 | 11/1978 | Moraw . |
| 4,140,373 | 2/1979 | Rüll . |
| 4,150,781 | 4/1979 | Silverman et al. ............... 235/467 |
| 4,171,864 | 10/1979 | Jung et al. . |
| 4,269,473 | 5/1981 | Flothmann et al. . |
| 4,563,024 | 1/1986 | Blyth . |
| 4,732,410 | 3/1988 | Holbein et al. . |
| 4,812,631 | 3/1989 | Hiramatsu ........................ 359/2 |
| 4,832,445 | 5/1989 | Haines et al. . |
| 4,889,366 | 12/1989 | Fabbiani . |
| 5,044,707 | 9/1991 | Mallik . |

FOREIGN PATENT DOCUMENTS

| | | | |
|---|---|---|---|
| 3728622 | 5/1988 | Fed. Rep. of Germany | 283/86 |
| 2240948 | 8/1991 | United Kingdom | 283/86 |

Primary Examiner—Edward K. Look
Assistant Examiner—F. Daniel Lopez
Attorney, Agent, or Firm—Ralph W. Selitto, Jr.

[57] ABSTRACT

A method for increasing the authentication effect of a verification hologram to be affixed to a protected document includes laser etching individualized indicia into the reflective layer of each hologram produced en masse on a moving, continuous web. The laser is finely focused and guided by a computer which records the data used to form the selected indicia, such data being referenced for comparison to provide verification of authenticity upon presentation by a bearer. In one embodiment, the data used to create the indicia is generated by a computer program which may include a random number generator.

36 Claims, 1 Drawing Sheet

LASER ENGRAVED VERIFICATION HOLOGRAM AND ASSOCIATED METHODS

FIELD OF THE INVENTION

The present invention relates to holograms used for verifying the authenticity of documents, credit cards and the like, and more particularly to a hologram and a method for producing same wherein indicia having significance independent from the content of the hologram becomes inextricably associated therewith.

DESCRIPTION OF THE PRIOR ART

It has remained a challenge since the inception of documents having value or power premised upon authenticity to prevent forgery or alteration. There are essentially two forms of authentication which are generally required, viz., that the document is authentic, i.e., it has not been forged or altered, and that the bearer is the proper owner. Numerous strategies have been employed to achieve these authentication goals. For example, currency is printed on unique paper in patterns which are extraordinarily difficult to copy; checks require the signature of the payee which can be compared to a sample on file; and identification cards, such as driver's licenses frequently bear a photograph of the owner. Secret access codes combined with possession of an access card permit account holders to withdraw money from automated teller machines. In recent years, holograms have been incorporated into credit cards and other access cards and valuable documents for the purpose of assuring authenticity. The principle authentication objectives and means of achieving them is similar in each of the foregoing schemes, in that the issuer has in its control some special way of making the authentic document, "key card" etc., readily identifiably unique and difficult to copy or alter. In addition, on "nonbearer" instruments which are intended to be used by only one individual such as a credit card, connector information is contained in or on the document which connects the empowered individual with the document, to assure that the bearer is the owner. Holograms are appropriate for the purpose of authenticating documents because the equipment utilized to make a hologram is expensive and complex and thus not readily available to the thief or forger, and in this respect, are like the complex plates used to print currency. In addition, there is no known way to produce a hologram other than employing this complex and expensive apparatus. To enhance the authenticating effect of a hologram associated with a document, it is frequently incorporated in or on the document such that its removal, for the purpose of affixing it to a forgery, for instance, results in its destruction. Thus the hologram may be securely glued to or laminated in the protected document such that upon removal, the integrity of the hologram is lost—an attribute which is readily apparent to the inspector for authenticity. Due to the complexity and expense required to produce a unique hologram, it is not appropriate, using known methods, to create holograms having individualized indicia. That is, for mass-produced documents requiring authentication, such as credit cards or passports, it is not feasible to produce unique holographic images embodying, e.g., each cardholder's name and social security number. It is therefore an object of the present invention to provide a hologram for authentication purposes which has associated therewith indicia which can vary for each document to be authenticated so that each hologram is unique.

It is a further object to provide the aforesaid indicia in intimate association with the hologram such that they can not be separated or the indicia altered. It is yet a further object that a hologram be provided with indicia that serves to connect the owner with the hologram such that a non-entitled bearer is not empowered by mere possession.

SUMMARY OF THE INVENTION

The problems and disadvantages associated with the conventional techniques and devices utilized to authenticate documents, credit cards and the like are overcome by the present inventive method which includes forming a hologram, then selectively etching indicia into it.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
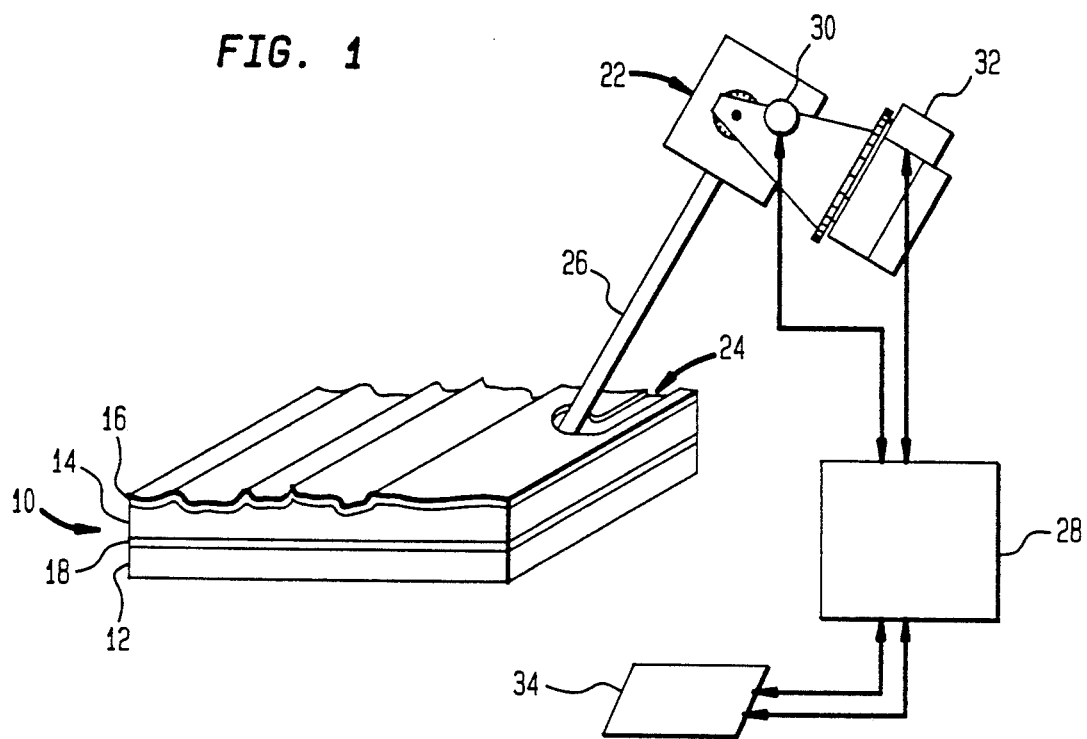
FIG. 1 is a pictorial, perspective view of a hologram segment, shown partially in cross-section and being laser etched in accordance with an exemplary embodiment of the present invention.
Figure 2:
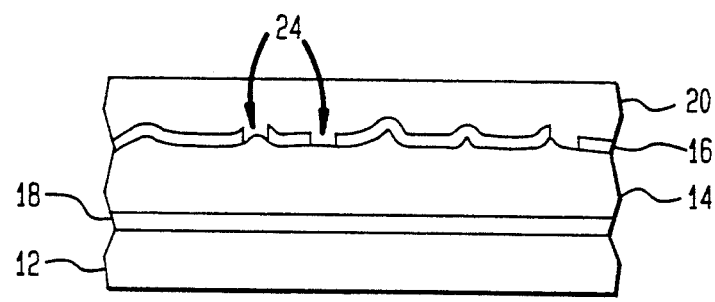
FIG. 2 is a cross-sectional view of a laser etched phase hologram such as would be prepared by the process illustrated in FIG. 1.

FIG. 1 shows a composite film 10 into which holographic information has been embossed. The film 10 includes a carrier layer 12, e.g., a thin film of optically clear polymer. The carrier layer serves as the mechanical support for the hologram which is embossed into a layer of embossable material 14. As is known in the art, holographic images may be produced in embossable media by the action of a suitable die which is pressed into the embossable media to impart a microcorrugation upon a surface of the media and yielding a complex diffraction grating. The die is produced by known holography and metal deposition techniques. Given a microtextured diffraction grating on a surface of the embossable media, the microtexture is coated with a substance having a different refractive index than that of the embossable media and differing from the refractive index of air, thus setting up a reflective surface and, consequently, a phase hologram. In the embodiment shown, the reflective surface is achieved by the use of an aluminum layer 16. The hologram is viewed through the carrier layer 12. A release layer 18 may be provided between the embossable media layer 14 and the carrier layer 12. The purpose of the release layer 18 is permit non-destructive separation of the hologram residing in the embossable layer 14 and reflective layer 16 from the carrier sheet 12. As shown in FIG. 2, the film 10 may also include an adhesive layer 20 for affixing the hologram to a selected substrate either with the carrier layer 12 or, in the event a release layer 18 is provided, separately therefrom. As is known in the art, there are other forms of holograms on which the present inventive method can be practiced, as shall become evident below. The present invention, however, preferably employs a phase hologram.

FIG. 1 further illustrates a laser 22 etching indicia 24 into the reflective aluminum layer 16. During this process, the laser beam 26 vaporizes the aluminum where it strikes it. This results in the removal of the reflective layer 16 in the areas traversed by the beam 26. The area of the hologram engraved by the laser 22 can be of a scale which is readily apparent to the unaided eye of an authenticator. That is, the removal of the reflective layer 16 in the example shown, results in non-reflection at all areas of removal. Since the carrier layer 12 in the example has been described as optically clear, the indicia 24 is then transparent in contrast to the surrounding area which comprises a hologram. Alternatively, if the phase hologram were affixed to an opaque substrate, such as by laminating it to an opaque credit card, the indicia 24 would appear in the color of the opaque substrate. In the case of the transparent substrate, backlighting would yield luminous indicia where the light shines through it. Thus it can be seen that a hologram can be laser engraved with visually discernable and understandable indicia, e.g., readable alphanumeric characters, which has some meaning or significance.

Since the beam 26 can be turned on and off and its position, focus and intensity controlled within quite small tolerances, precisely dimensioned graphic indicia can be engraved into the aluminum layer 16 using this technique. The use and control of laser beams for this sort of laser etching can be accomplished by commercially available equipment such as can be obtained from the Control Laser Corporation of Orlando, Fla. Presently, such apparatus are applied to a variety of marking tasks such as the marking of metal and plastic parts with identifying numbers. To Applicant's knowledge, however noon has previously proposed the use of a laser writing apparatus for etching verification holograms. Given that a laser engraving apparatus of the type described is a relatively expensive and specialized device, its use in combination with holograms further adds to the improbability that the common thief would have the equipment and expertise to foil the authenticating significance of a laser engraved hologram. To recapitulate then, the present invention provides an authenticating hologram having indicia precisely formed therein such that the quality and complexity of the combination would be very difficult to copy. In addition, since the indicia is formed directly in the hologram, which in turn is laminated or otherwise secured to a substrate, the indicia is quite difficult to change without destroying the hologram.

Laser writing apparatus of the sort described above include a computer controller 28 which, via positioning motors and associated transducers 30, 32, controls the movement of the laser beam 26. In addition, such systems require an input device 34 whereby the computer receives instructions from the operator as to what indicia is to be written, where it is to be written, etc. A keyboard is typically utilized to select from available predefined character fonts provided with the operating system of the laser writer and to input the various operating parameters for controlling the writing of indicia by the laser.

Alternatively, in accordance with the present invention, character fonts for indicia to be written may be custom made by the operator or could, e.g., be generated by an algorithm. The algorithm may be of a type which generates constantly changing font composition based upon a random number generator. In this manner, the correlation between the bit composition of a selected character as written with the laser and the alphanumeric character for representing real data can be a changing code. Alternatively, the input device can include a digitizer pad which transduces the writing or signature of the operator or a cardbearer into digital form. Thus, there are practically limitless variations for expressing input information into laser written indicia given known input devices in combination with computing methods and algorithms for generating the indicia. This ability to encode information in laser written indicia finds utility in the area of verification, in that the encoding may be made not readily discernable and thus not amenable to copying or alteration. The complexity of any correlation or code is not by necessity burdensome to the verifier because computer generated data or any data which is put into digital form for processing by a computer is readily storable in large volume and in explicit detail. Given that data or instructions which are used to generate indicia can be recorded contemporaneously while such indicia is actually made by laser engraving, it follows then that this data could also be summoned from a data bank as the standard for checking indicia which is expected on an authenticating hologram when the hologram is presented by the bearer. This manner of authenticating can include a digitizing scanner which can digitize the hologram presented by the bearer, such that the digital coding of the presented hologram can be compared by a computer with the digital record previously made with respect to that individual hologram during the formation of the indicia.

If the laser engraved indicia is in a form which is readable as character information by a human examiner, this does not obviate the inclusion of indiscernible and hard to copy variations in individual holograms. Unique variations can be expressed as minor variations in character shape, size, etc. In the alternative, the indicia can be in a form which is not readily readable by a human viewer. For example, the indicia can be in the form of a bar code or other pattern which is machine readable by a scanner. In yet another alternative embodiment, the indicia can merely or partly be a unique pattern having no meaning other than as an embodiment of a set of data points for the purpose of comparison with a stored standard at the time of authenticity.

As an alternative to using a digital scanner to assist verification, the expected appearance of the laser etched hologram can be compared to a standard by visual inspection. A visual check could be enhanced by using a stereoscopic microscope or by projecting the expected image over the presented image in superposition. Besides checking for indicia size and shape, the quality of the engraved indicia also constitutes a source of verification, in that laser engraving produces line quality which is very difficult to equal with other methods.

Since the power of the laser beam 26 can be varied, the depth of the laser engraving is controllable. Accordingly, the laser can be set to remove the reflective layer 16; can penetrate through the entire composite film 10; or only selected layers thereof. In the event that a carrier layer 12 is used and the laser is set to burn through the entire film 10, the shape of the laser indicia appearing in the hologram will be replicated in the carrier film 12. Thus the carrier film 12 can be compared for verification purposes to the hologram indicia upon presentation.

During the production of the holograms, which may be mass produced on a continuous web, the holograms can be laser etched as the web of holograms is advanced in front of the laser. In this event, the laser motion can be coordinated with the motion of the advancing web by the computer controller given a suitable input from a sensor sensing upon the motion of the web.

FIG. 2 shows a hologram like that shown in FIG. 1 in cross-section and after having been laser engraved. An adhesive layer has been coated upon the aluminum layer such that the hologram can be affixed to any desired substrate, such as a document to be verified.

It can be appreciated that the present invention provides a verification hologram which is individualized even when mass produced. This is accomplished by employing a laser to etch selected indicia into each of the mass produced holograms under computer control. The instructions and data used to control the laser etching may be recorded for later verification of authenticity upon presentation of a document or card bearing the individual hologram. In this manner, mass produced security holograms can be closely accounted for, such as, by giving each valid hologram a serial number. This invention finds application in holograms employed to verify credit cards, money access cards, limited production documents to which a production serial number is attributed, passports, drivers licenses, and any other document or card requiring increased indicia of reliability and authentication.

It should be understood that the embodiments described herein are merely exemplary and that a person skilled in the art may make many variations and modifications without departing from the spirit and scope of the invention as defined in the appended claims.

We claim:

1. A method for increasing the authenticating effect of a hologram for affixation to a document comprises the steps of:
   (a) forming said hologram, said hologram having an embossable layer, a reflective layer deposited over said embossable layer and a carrier layer; and
   (b) selectively etching indicia into said hologram with a computer guided laser beam, said step of etching including removal of said reflective layer, said indicia being engraved through each of said embossable layer, said reflective layer and said carrier layer.

2. The method of claim 1, wherein said carrier layer and said embossable layer are separable and further including the steps of separating said carrier layer from said embossable layer and comparing said indicia engraved in said carrier layer with said indicia engraved in said embossable layer and said reflective layer to verify similarity upon presentation of said hologram.

3. The method of claim 1, wherein said reflective layer is Aluminum which is vaporized by said laser during said step of engraving.

4. The method of claim 1, wherein said indicia is at least partially in the form of alphanumeric characters.

5. The method of claim 4, wherein said characters are selected from standard fonts.

6. The method of claim 4, wherein at least a portion of said characters is variable over a range and the composition of said characters is determined during step of etching.

7. The method of claim 6, wherein the composition of said variable portion is determined by a computer program.

8. The method of claim 7, wherein said data representative of said indicia and said character composition is recorded during said step of etching.

9. The method of claim 8, wherein said computer program includes a random number generator which serves as a determinant in said character composition.

10. The method of claim 1, wherein a plurality of said holograms are arranged on a continuous web and further including the steps of moving said web during said step of engraving.

11. The method of claim 1, further including the step of recording data representative of said indicia.

12. The method of claim 11, wherein said recorded data is compared to said hologram upon presentation of said hologram to verify similarity.

13. The method of claim 12, wherein said comparison is visual.

14. The method of claim 13, wherein said comparison is made by superimposing an image generated from said recorded data upon said hologram presented for verification.

15. The method of claim 13, wherein said comparison is made by simultaneously viewing an image generated from said recorded data and said hologram presented for verification.

16. The method of claim 12, wherein said indicia is digitized for comparison to said recorded data, said recorded data being in digital form.

17. The method of claim 16, wherein at least a portion of said indicia is a variable bit pattern generated by a computer program.

18. The method of claim 11, wherein at least a portion of said indicia is machine readable via a scanning device and translates to alphanumeric characters.

19. The method of claim 18, wherein said machine readable portion is a bar code.

20. The method of claim 1, wherein at least a portion of said indicia corresponds to handwriting.

21. The method of claim 20 wherein said step of etching said indicia includes handwriting upon a digitizer pad to form an input to a computer controller.

22. The method of claim 1, wherein said hologram is affixed to a substrate which is at least partially light transmissive.

23. The method of claim 1, wherein said hologram is affixed to a substrate which is opaque.

24. A hologram comprises:
   (a) an embossable layer having a microtextured surface; and
   (b) a light reflective layer deposited over said microtextured surface, said reflective layer and said embossable layer having indicia laser engraved therein.

25. The hologram of claim 24, wherein at least a portion of said indicia is alphanumeric characters.

26. The hologram of claim 25, wherein said indicia is in the form of handwriting.

27. The hologram of claim 25, wherein said alphanumeric characters are selected from available standard fonts.

28. The hologram of claim 25, wherein said alphanumeric characters are at least partially generated by a computer program.

29. The hologram of claim 24, wherein said hologram is affixed to an opaque substrate.

30. The hologram of claim 29, wherein said substrate is visible through said indicia.

31. The hologram of claim 24, wherein said hologram is affixed to a substrate which is at least partially light transmissive.

32. The hologram of claim 31, wherein light transmitted through said substrate is visible through said indicia.

33. The hologram of claim 24, wherein said indicia is readable by an optical scanner.

34. The hologram of claim 33, wherein said indicia is a bar code.

35. The hologram of claim 24, wherein said hologram includes a carrier sheet upon which said embossable layer is disposed, said carrier sheet being engraved.

36. The hologram of claim 35, wherein said carrier sheet is separable from said embossable layer.

* * * * *